United States Patent

[11] 3,589,178

[72] Inventor Reimar Germann
 Graz, Austria
[21] Appl. No. 800,080
[22] Filed Feb. 18, 1969
[45] Patented June 29, 1971
[73] Assignee Hans List
 Graz, Austria
[32] Priority Feb. 19, 1968
[33] Austria
[31] A1553/68

[54] DEVICE FOR MEASURING TORSION IN A SHAFT
 3 Claims, 2 Drawing Figs.
[52] U.S. Cl. .................................................. 73/136A, 324/83
[51] Int. Cl. ...................................................... G01l 3/02
[50] Field of Search .......................................... 73/136; 324/83

[56] References Cited
UNITED STATES PATENTS

| | | | |
|---|---|---|---|
| 2,610,505 | 9/1952 | Hope ........................ | 73/70.1 |
| 3,194,065 | 7/1965 | Wilson ...................... | 73/136 |
| 3,258,961 | 7/1966 | Van Manen ............... | 73/136 |

Primary Examiner—Richard C. Queisser
Assistant Examiner—John Whalen
Attorney—Watson, Cole, Grindle & Watson ABSTRACT: A circuitry for the measurement of the angle of rotating machine elements having two impulse transmitters fixed within range of the rotating machine element and means including circuit connections in order to measure and valuate the information obtained from the rotating machine element.

DEVICE FOR MEASURING TORSION IN A SHAFT

The invention relates to a circuitry for the measurement of angles of shafts or other rotating machine elements at different rotational speeds, wherein in such places of the shaft between which the angle is to be measured, at least one mark cooperating with a stationary impulse transmitter is provided, the voltage pulses generated by the impulse transmitters being fed via one pulse shaper each to the two inputs of a bistable switch step at whose output a square wave pulse is developed, the width of which is directly proportionate to the angle of the shaft and whose rotational speed is indirectly proportionate to the said angle, a speed-responsive device for the balancing of the influence of the rotational speed upon the width of the square wave pulse being also provided.

Continuous monitoring of machine elements, particularly of shafts, is desirable in order to to be able to ascertain such defects as may occur during the operation of the machine, even before major damage is allowed to develop. Moreover, it should be ascertained by continuous monitoring whether the mechanical load is kept within reasonable limits. This applies in particular to the shafts of large-sized machines, such as propelling shafts and the like. Monitoring and/or periodical measurements of the angle permit the surveillance of stresses and loads produced by the torque.

According to conventional methods the torque is generally measured by means of extensometers or inductive pickups. Likewise, capacitive methods are known to exist. However, all of these methods are rather complicated and involve balancing procedures to be carried out during the operation of the machine.

According to another known circuitry of this type measurements are made by means of impulse transmitters. The drawback of this known system resides in the fact that the reading obtained at the output of the circuitry for the torque angle is dependent upon the rotational speed of the machine or machine element. In order to operate at different rotational speeds it is therefore, necessary to appropriately correct the rotational speed which requires the computation of the torque angle by means of a complicated formula. An angle reading independent from the rotational speeds is obtainable with this circuitry only by means of computers.

It is the object of the invention to provide a circuitry capable of producing angle readings directly in complete independence from the prevailing rotational speed, and highly accurate readings at that. According to the invention, the pulse shapers consist of circuits known per se and comprising a limiter stage, a Schmitt trigger, a phase-reverter stage and a monostable vibrator and generating square wave pulses of a constant height and width whose ascending slopes are synchronized with the voltage zero point of the transmitter pulses, the bistable switch step being connected to an integrator circuit comprising an adjustable resistor controlling its time constant, the said integrator circuit being in turn connected to a peak-voltage measuring instrument, a circuitry of a type known per se being provided for the balancing of the influence of the rotational speed, the latter circuitry generating a direct voltage proportionate to the rotational speed of the shaft, the said direct voltage affecting the controllable resistor of the integrator circuit in such a manner that at any given rotational speed the same peak value of the integrated voltage is generated at the output of the peak-voltage measuring instrument.

Thus this circuitry serves to produce a direct reading of the angle with simple circuit elements, the said reading being not only applicable to all rotational speeds occurring in actual practice but also distinguishing itself by a high degree of precision. The latter feature is due to the method of transforming the voltage pulses generated by the impulse transmitters into synchronized square wave pulses. This conventional method of pulse-shaping is of particular importance for the circuitry according to the invention because the determination of the angles of rotating machine elements generally involves the measurement of extremely small angles requiring a very accurate determination of the exact time when the marks register with the impulse transmitters. Conventional impulse transmitter circuits generally disregard the fact that already the processing of transmitter pulses involves a certain degree of dependence on the rotational speed inasmuch as the square wave pulse obtained is increasingly delayed as the rotational speed rises. This drawback will not arise with the circuitry according to the invention, as the same develops a square wave pulse of constant height and width whose ascending slope is synchronized at any given speed with the voltage zero point of the transmitter pulse.

According to a preferred embodiment of the invention, a Miller integrator is provided to serve as an integrator circuit, comprising an operation amplifier, a capacitance and a transistor, preferably a field-effect transistor whose bulk resistance is controlled by the direct voltage of the circuitry for the balancing of the influence of the rotational speed.

In many cases it will also be desirable to obtain a zero output voltage for a given angle. For that purpose, according to another feature of the invention, one of the impulse transmitters is adjustable so as to permit the presetting of a determined angle.

Further details of the invention will appear from the following description of an embodiment of the invention with reference to the accompanying drawings in which.

At the extremities of the shaft to be examined, or generally, at the points between which the angle is to be measured, two disks disks 1 and 2 each having an indicator member are provided. These discs preferably consist of a nonmagnetic material and each of them carries a mark of a ferromagnetic material. The discs are secured in such a manner that the marks register when the shaft is not under load, so as to be located on an imaginary axis-parallel line. Adjustment can be facilitated easily by firmly securing each disc separately and aligning them on the imaginary line by appropriately displacing the electromagnetic pickup. The pulses are preferably generated by two rugged electromagnetic impulse transmitters 3 and 4.

However, it is also possible for the voltage pulses to be developed by photoelectric means via light barriers. Under certain circumstances a plain nut or another indicator element attached to the shaft, can be substituted for the discs disks hereabove described.

Figure 2:
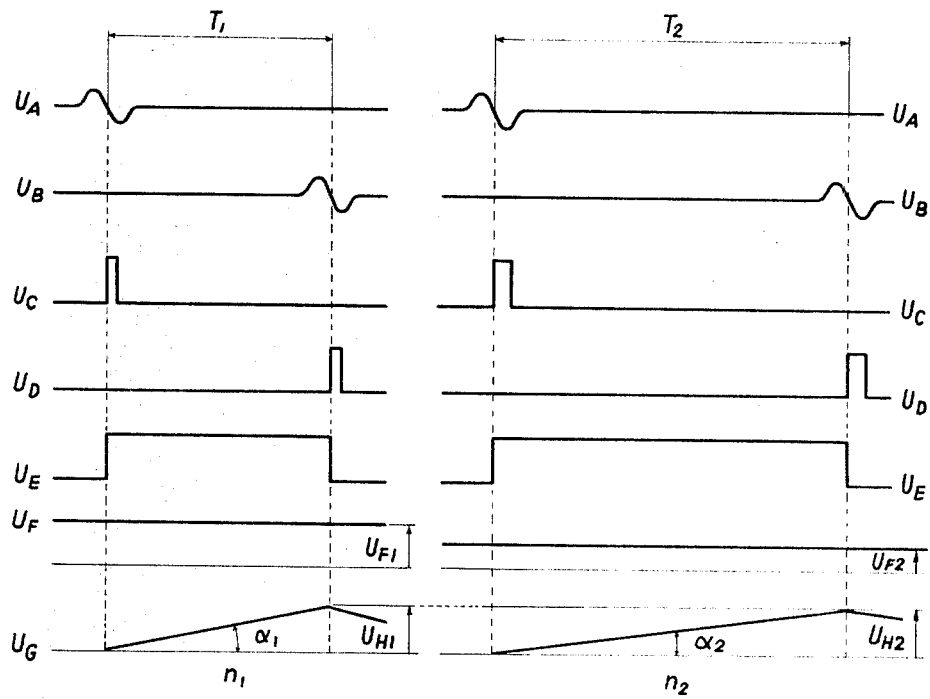
FIG. 2 illustrates the pulse schedule at individual points indicated in FIG. 1 with the chronological correlation for two different rotational speeds $n_1$ and $n_2$.

During the passage of the indicator element of the discs 1 and 2 an electric voltage is induced in the electromagnetic impulse transmitters. Thus a voltage pulse $U_A$ and $U_B$ is generated at the impulse transmitters 3 and 4, respectively (see FIG. 2). When the shaft is rotated, these two pulses are out of phase by the time $T_1$ and $T_2$, respectively, the time lag between the two pulses being a function of the shaft to be monitored or examined. In order to make sure that the impulses are generated exactly at the moment when the indicator element passes the associated impulse transmitter, the two electromagnetic impulse transmitters 3 and 4 are connected to circuits 5 and 6, respectively, of a type known per se and serving to develop a pulse independent from the rotational speed in synchronization with the passage of the indicator element by the impulse transmitter. At the output of these two circuits, that is at the points C and D, square wave voltages $U_C$ and $U_D$ respectively, of a constant width and a constant height are thus developed. The ascending slopes of these square wave pulses are out of phase in relation to each other, such dephasing being proportionate to the torque angle of the shaft. By the use of the synchronized transmitter pulses which are independent from the rotational speed, determination of the torsion of the shaft is assured with an extremely high degree of accuracy at any rotational speed.

By means of the ascending slope of the square wave pulses $U_C$ and $U_B$ hereabove described a bistable trigger stage 7 is actuated. Thus a square wave pulse $U_E$ is developed at the output E of this trigger stage 7. The width of this square wave pulse is proportionate to the angle of the shaft to be examined or monitored. This square wave pulse $U_E$ is fed to an integrator circuit 13. This integrator circuit is preferably a Miller integrator comprising an operation amplifier 10 featuring a very high no-load gain and RC members 9 and 11. In the present instance the resistance R is formed by the resistance, controllable by means of a control resistance, between the positive and negative sources of a field-effect transistor 9.

If the time constant of the RC member of the integrator circuit used were to remain unchanged, different output voltages would obtain at the integrator for different times $T_1$ and $T_2$ corresponding, as explained above, to the respective angles. However, the time lag between the pulses $U_E$ and $U_B$ and consequently, the duration of the square wave pulse $U_E$ would be different for the same angle if rotational speeds were to differ, which means that provided the time constant of the integrator member remains unchanged, different output voltages will obtain at the integrator for different rotational speeds, as hereabove explained. It is therefore, necessary to vary the time constant of the RC member as a function of the rotational speed of the machine or of the shaft under examination in such a manner that for the same angle the amplitude at the output of the integrator remains the same for different periods of time.

Figure 1:
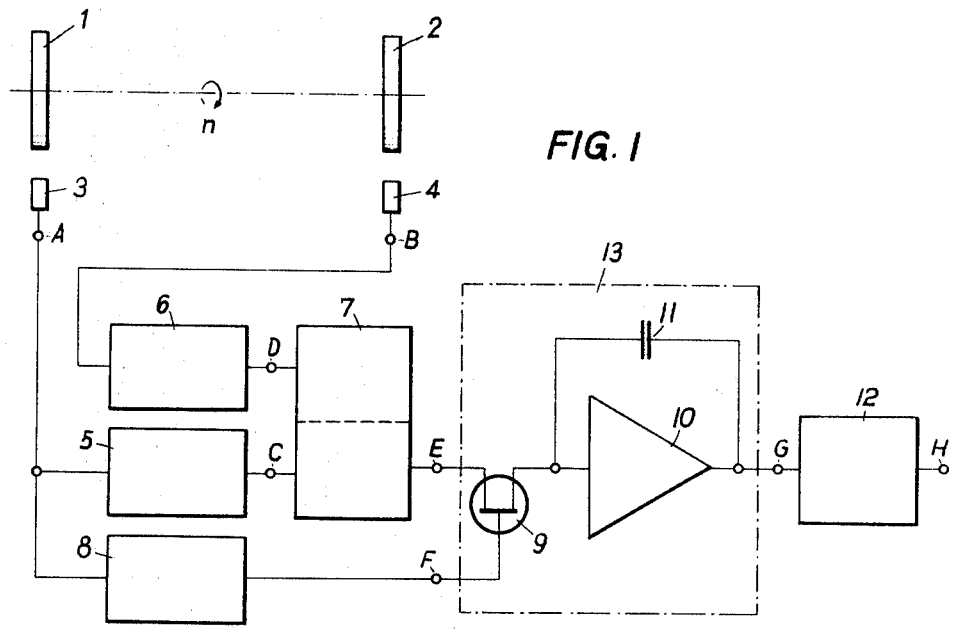
FIG. 1 shows the block diagram of the circuitry according to the invention.

According to the present invention provision is made for a control system by means of which a direct voltage proportionate to the rotational speed is obtained as a function of such speed. The necessary transformation can be achieved in a simple manner by feeding the pulses of an electromagnetic impulse transmitter, such as for example, the transmitter indicated by reference number 3 in FIG. 1, to any one of the circuits already known (reference number 8 in FIG. 1). One of the known circuits is arranged in such a manner that the pulses developed by the impulse transmitter 3 are transformed into square wave pulses of constant width and height and thereafter fed to an integrator, thereby obtaining a voltage which is proportionate to the rotational speed. In the present instance this direct voltage which is proportionate to the rotational speed is used for the purpose of appropriately affecting the resistance of the RC integrator member. In the example illustrated in the accompanying drawings the variable resistance is produced by a field-effect transistor 9. By altering the voltage between the grid and the source, the bulk resistance of the field-effect transistor 9 will also be varied, as a result of which the time constant of the integrator member is modified as a function of the rotational speed. By the integration of the square wave pulse $U_E$ a linear voltage rise is produced at the output of the integrator. This rise is characterized by the angles $\alpha_1$ and $\alpha_2$ in FIG. 2. As a result of the alteration of the time constant this angle is modified in such a manner that for the time lags $T_1$ and $T$ of consecutive pulses corresponding to different rotational speeds $n_1$ and $n_2$, the same output voltage $U_{H1}=U_{H2}$ is obtained for identical angles.

By connecting a peak-voltage measuring instrument 12 to the integrator, the peak value of the output voltage of the integrator and consequently, the angle is directly determined.

However, it is obviously also possible to use a different integrator circuit, wherein according to the invention the time constant of the integrator circuit has to be influenced as a function of the rotational speed of the shaft under examination. Thus it is also possible to use a Bootstrap circuit, for example. The time constant of the RC member can obviously also be affected by an alteration of the capacitance 11.

According to a further embodiment of the invention it is possible to connect a discriminator circuit for the determination of limits to the peak-voltage measuring instrument 12 in order to ascertain regularly if and when the angle either falls short of, or exceeds the preset value.

By the provision of an adjustable mount for the electromagnetic impulse transmitter it is possible to balance the time lag between the pulses for a certain constant torsion of the shaft as far as zero, so as to reduce also the output voltage $U_H$ of the circuitry to zero, which means that no output voltage is obtained at all for a constant angle. If and when the torque angle varies an output voltage indicating this variation is produced depending on whether the change is of a positive or negative nature. It is thus possible to use this circuitry for control equipment destined to produce a constant torque. Any deviations are readable at the output of the circuitry whereas the rated value is present by the appropriate adjustment of any one of the electromagnetic impulse transmitters 3 or 4.

I claim:

1. A device for measuring the torsion in a shaft having a known relationship between applied torque and torsion of the shaft, comprising two axially spaced indicating marks located on said shaft, two pulse transmitter means, each located in the vicinity of one of said marks and adapted to emit a pulse upon the passage of said mark past said transmitter, one pulse shaper each connected to the output of one of the said impulse transmitters, each of the said pulse shapers consisting of a limiter stage, a Schmitt trigger whose input is connected to the output of the said limiter stage, a phase-reverter stage connected to the output of the said Schmitt trigger and a monostable vibrator whose input is connected to the output of the said phase-reverter stage, the said pulse shaper developing square wave pulses of constant height and width, the ascending slope of the said square wave pulses being synchronized with the voltage zero point of the pulses generated by the said impulse transmitters, further comprising a bistable switch step whose inputs are connected each to the output of one of the said pulse shapers, an integrator circuit connected to the output of the bistable switch step and comprising a controllable resistor controlling the time constant of the integrator circuit, a peak-voltage measurement device whose input is connected to the output of the said integrator circuit, a device for balancing the effect of the rotational speed upon the width of the square wave pulse developed at the output of the said bistable switch step, the said device being connected to the output of one of the said impulse transmitters and generating a direct voltage proportionate to the rotational speed of the said shaft, the said direct voltage controlling the controllable resistor of the said integrator circuit, in such a manner that the same peak value of the integrated voltage is developed at the output of the said peak-voltage measuring device at a constant torsion of the said shaft irrespective of its rotational speed.

2. A device according to claim 1, wherein a Miller integrator is provided forming the said integrator circuit and comprising an operation amplifier whose output is connected to the input of the said peak-voltage measuring device, a capacitance connected in parallel to the operation amplifier and a field-effect transistor whose source is connected to the output of the said bistable switch step, the negative source of same being connected to the input of the said operation amplifier, the grid of the said field-effect transistor being connected to the output of the said device for the balancing of the influence of the rotational speed.

3. A device according to claim 1, wherein an adjustable arrangement of the said impulse transmitter in relation to the presetting of a certain torsion of the said shaft is provided.